United States Patent
Schiro et al.

(10) Patent No.: US 8,921,454 B2
(45) Date of Patent: Dec. 30, 2014

(54) SOLID MARKING COMPOSITION

(75) Inventors: Francis G. Schiro, Doylestown, PA (US); Richard J. Kaiser, Doylestown, PA (US)

(73) Assignee: John P. Nissen Jr. Company, Glenside, PA (US)

( * ) Notice: Subject to any disclaimer, the term of this patent is extended or adjusted under 35 U.S.C. 154(b) by 3 days.

(21) Appl. No.: 13/611,190

(22) Filed: Sep. 12, 2012

(65) Prior Publication Data

US 2014/0073728 A1    Mar. 13, 2014

(51) Int. Cl.
*C09D 13/00*    (2006.01)
*C08K 5/098*    (2006.01)
*B28B 1/14*    (2006.01)
*B29C 39/38*    (2006.01)

(52) U.S. Cl.
USPC ....... 523/164; 524/394; 106/31.08; 106/31.1; 264/299

(58) Field of Classification Search
USPC ............... 523/164; 106/31.08, 31.1; 264/299; 524/394
See application file for complete search history.

(56) References Cited

U.S. PATENT DOCUMENTS

| 4,829,108 | A | | 5/1989 | Okuda et al. |
| 5,290,348 | A | * | 3/1994 | Auslander ................. 106/31.15 |
| 6,033,464 | A | * | 3/2000 | Craig ......................... 106/31.29 |
| 6,203,910 | B1 | * | 3/2001 | Fukuo et al. .................. 428/413 |
| 7,291,210 | B2 | | 11/2007 | Nakamura et al. |
| 7,297,732 | B2 | | 11/2007 | Shirota et al. |
| 2003/0029354 | A1 | | 2/2003 | Seki |
| 2009/0247668 | A1 | | 10/2009 | Sumitomo et al. |
| 2010/0016471 | A1 | * | 1/2010 | Sumitomo et al. ............ 523/164 |

FOREIGN PATENT DOCUMENTS

| EP | 2065450 A1 | | 3/2009 |
| JP | 8120209 A | | 5/1996 |
| JP | 2004107546 A | | 4/2004 |
| WO | WO 95/34611 | * | 12/1995 |

OTHER PUBLICATIONS

Notification of Transmittal of the International Search Report and the Written Opinion of the International Searching Authority (PCT/ISA/220) issued Feb. 25, 2013 in counterpart International Application No. PCT/US2012/054783.
International Search Report (PCT/ISA/210) issued Feb. 25, 2013 in counterpart International Application No. PCT/US2012/054783.
Written Opinion of the International Searching Authority (PCT/ISA/237) issued Feb. 25, 2013 in counterpart International Application No. PCT/US2012/054783.

* cited by examiner

*Primary Examiner* — Tae H Yoon
(74) *Attorney, Agent, or Firm* — Caesar, Rivise, Bernstein, Cohen & Pokotilow, Ltd.

(57) ABSTRACT

This invention relates to a solid marking composition comprising at least one resin, at least one pigment, at least one dispersant, at least one solvent, and a gelling agent. This invention also provides a method of making the solid marking composition.

11 Claims, No Drawings

SOLID MARKING COMPOSITION

BACKGROUND OF THE INVENTION

1. Field of Invention

This invention relates to a solid marking composition which can be used for writing instruments, a marking stick, coating materials, and the like.

2. Description of Related Art

Many of today's fabrication, repair, and assembly of routine and customized engineering works require the measurement, cutting, welding, and joining of many parts. These parts must be designed and the image and dimensions transferred to the material of construction. That material may be glass, metal, ceramic, wood, plastic or any combination thereof. Once the dimensions of the object to be fabricated are transferred to the appropriate material, the cutting and joining processes may proceed.

These marks on construction materials must meet a number of performance criteria. The modern machine shop utilizes a number of fluids such as oils, water, and cooling fluids. Frequently these fluids are spilled, sprayed, or condense on construction materials. Once this occurs, it is often not practical to remove these fluids from construction materials as it would add unnecessary expense and delay to the construction. Most liquid based markers cannot write through all of these fluids. They will usually stop writing, sometimes permanently, when they contact fluid of a dissimilar nature to the internal ink.

An improvement to liquid markers in the fabrication process is a solid marker. A solid marker will not stop working if it encounters a dissimilar fluid material. If the solid marker is formulated and constructed properly, it will write through these liquids and make a discernable mark on the materials of construction, thus saving time and money in the fabrication process.

The solid marker must have a melting point such that it can be processed into the marker format, and also survive the environment of a typical warm fabrication or repair facility. In addition, it must also survive the rigors of the distribution and shipping system that it will encounter. This is so that the solid marking composition does not fail abruptly at an elevated temperature, but rather slowly across an elevated range of temperatures.

The final mark must be waterproof when dry, and also weather resistant. Markers are frequently used in maintenance activities in out-of-the-way locations such as on the top of wind mill generators many hundreds of feet in the air. Here one mechanic may want to leave information for a future mechanic. In certain situations, it may be necessary to remove a mark. To do this, the solid marking composition must be soluble in some solvent.

BRIEF SUMMARY OF THE INVENTION

The present invention provides a solid marking composition comprising at least one resin, at least one pigment, at least one dispersant, at least one solvent, and a gelling agent.

In certain embodiments, the solid marking composition provides waterproof and weather resistant marks.

In certain embodiments, the solid marking composition melts at about 50-75° C.

In certain embodiments, the gelling agent comprises at least one wax and optionally at least one wax modifier.

In certain embodiments, the resin is selected from the group consisting of polyimide, rosin ester and combinations thereof. In certain embodiments, the resin is about 3-15% by weight.

In certain embodiments, the at least one wax is selected from the group consisting of a Montan wax, a synthetic Montan wax, a sorbitol/sebacic acid copolymer behenate, a synthetic wax comprising a C18-C36 acid glycol ester, linoleic acid, stearic acid, oleic acid, and combinations thereof.

In certain embodiments, the waxes are about 10-15% by weight.

In certain embodiments, the optional at least one wax modifier is used and the at least one wax modifier comprises a stearate salt.

In certain embodiments, the wax modifier is about 1-16% by weight.

In certain embodiments, the at least one solvent is selected from the group consisting of isopropyl alcohol, denatured alcohol, an ester, and combinations thereof.

In certain embodiments, the at least one solvent is about 5-40% by weight.

In certain embodiments, the solid marking composition comprises at least two solvents.

In certain embodiments, the dispersant is a polymer.

In certain embodiments, the dispersant is about 0.5-10% in weight.

The present invention provides a method of making a solid marking composition comprising at least one resin, at least one pigment, at least one dispersant, at least one solvent, and at least one gelling agent, wherein the gelling agent comprises at least one wax and optionally at least one wax modifier, comprising the following steps:

a. add resin to the at least one solvent, and dissolve by stirring with heat;
b. add the at least one pigment and the at least one dispersant;
c. optionally increase the heat;
d. add the at least one gelling agent and optionally add the at least one wax modifier;
e. cast into a mold.

DETAILED DESCRIPTION OF THE INVENTION

The present invention was prompted by the need for a marking composition that fulfills the following criteria in addition to the standard features of a marking composition.

First, a marking device that uses a solid marking composition. A solid marker will not stop working if it encounters a fluid material. If the solid marker is formulated and constructed properly, it will write through these liquids and make a discernable mark on construction materials, thus saving time and money in the fabrication process.

Second, the markings need to adhere to glass, metal, ceramic, wood, plastic, and the like, or any combination thereof.

Third, the solid marking composition must have a melting point such that it can be processed into the marker format and also survive the environment of a typical warm fabrication or repair facility. In addition, it must also survive the rigors of the distribution and shipping system that it will encounter. This is so that the solid marking composition does not fail abruptly at an elevated temperature, but rather slowly across an elevated range of temperatures. Thus, the melting range of the solid composition may be about, for example, 50-75° C.

Fourth, the final dry mark must be waterproof and weather resistant. As set forth above, marking devices are frequently used, for instance, in maintenance activities on out-of-theway locations such as on the top of wind mill generators many hundreds of feet above ground. The marks are exposed to the elements in these situations. Often times, one mechanic may want to leave information for a future mechanic.

Fifth, the final marks need to be removable when necessary. In certain situations, it may be necessary to remove the markings on the work surfaces.

The present invention has provided solutions to the requirements above. The inventors provide a solid marking composition comprising a resin, a pigment, a dispersant, a gelling agent, and at least one solvent, wherein the gelling agent comprises at least one wax and an optional wax modifier.

In certain embodiments, the solid marking composition of the invention also comprises other additives.

The inventors also provide a method of making the solid marking composition of the invention. The method comprises admixing the above-mentioned components uniformly.

Resin

The resin component for the solid marking composition is not particularly restricted. It is important that the resin is soluble in the carrier solvent of choice for ease of manufacture, and soluble in a widely used solvent so that the markings may be removed when desired. Convenient solvents which may be used in the invention include, for example, low molecular weight alcohols (such as ethyl alcohol, propanol, and isopropyl alcohol) and esters (such as ethyl acetate, and ethyl lactate) solvents. On the other hand, because the markings need to endure outdoor conditions and the elements, the resin needs to be water resistant and therefore insoluble in water. Thus, the resin needs to be soluble in the solvents such as ethyl alcohol, isopropyl alcohol and ester, but insoluble in water.

Examples of suitable resins include rosin, polyamide resin, polyimide resin, fumaric resin, maleic resin, acrylate resin, ketone resin, xylene resin. Preferred examples of resins are rosin resin, polyamide resin, and polyimide resin. The rosin resin can be exemplified by the trade name "Resinall 807A."

The resin content depends on the type of resin used but is typically used in the amount of about 3-15%, and preferably about 9-12%.

Solvent

Examples of solvent include alcohols (such as methanol, ethanol, propanol, isopropanol), esters, naturally derived plant esters, blends of bio-based plant esters, blends of bio-based plant esters and petrochemical based solvents, trimethylol propane, glycol ethers (such as ethylene glycol monomethyl ether, diethylene glycol monomethyl ether, dipropylene glycol monomethyl ether and dipropylene glycol monopropyl ether), and combinations thereof. Alcohols are readily available, safe to use, and low cost. A particular example of a solvent is IPAR 100 which is a blend of three bio-based plant esters that have a solubility similar to isopropyl alcohol, but have a higher flash point.

It is preferable that a combination of two solvents is used. The content of the first solvent is about 5-20% by weight with respect to the total amount of a solid marking composition. Although the optimum content of a solvent, in particular, somewhat varies depending on kinds of solvents, it is about 10-15% by weight.

A second solvent may be used to impart improved writing characteristics. An example of a second solvent is Soyclear 1500, which is a methyl ester derivative of soybean oil, imparts smoother writing characteristics to the solid marker. The second solvent can be present in concentrations of, for example, about 1-20%, and preferably from about 5-15%.

Pigments

In addition to providing visibility, pigments are used to serve a range of functions known in the art. It is important that pigments should not react with other pigments. Further, it is preferable that a pigment be dispersible. Suitable pigments for use in the present invention are those generally well-known in the art. Specific examples include, for example, traditional pigments, inorganic pigments such as carbon black and titanium oxide, organic pigments such as copper phthalocyanine pigments, threne pigments, azo pigments, quinacridon pigments, anthraquinone pigments, dioxane pigments, indigo pigments, thioindigo pigments, perinone pigments, perylene pigments, indolenone pigments and azomethine pigments and the like, and fluorescent pigments, and the like.

Further, traditional pigments as well as synthetic pigments such as micaeous, glitter, glass flake, polymeric chromophores, and metallic pigments can be incorporated into the composition. In this case, it is preferable to use pigments in the Class 1 category as defined by ASTM D4303-10 to provide fade resistance in sunlight since the marking composition may be used outdoors.

Further, the present invention can use one species of a pigment or can use two or more species of pigments in combination. Furthermore, they can be mixed with opacifying pigments including, for example, a variety of inorganic or organic white pigments such as titanium oxide, barium sulfate, alkylene bismelamine derivatives, polymeric pigments (synthetic resin particle pigments such as acrylates that include a hollow polymer shell and a void space for air) with opacifying power of various shapes including spherical shapes, oblate shapes either alone or in combination with two or more of them. Proper visibility and color adjustment can be accomplished by the use of an opaque pigment.

Further, pigments are used to improve the writing properties of the composition. For example, the unique shape of Wollastonite or Talc pigments enhances the flow of the molten solid composition when it melts from frictional forces during the marking process. Wollastonite is a calcium metasilicate mineral that may contain small amounts of iron, magnesium and manganese. Its plate like morphology imparts a smoother flow to the solid marker.

It is preferable that the content of a pigment is about 0.5-30% by weight with respect to the total amount of the solid marking composition. More preferably, the content of a pigment is about 2-25%.

When Wollastonite or Talc pigment is present, it can be in the range of about 2-15%, preferably about 4-12%. An opacifying pigment can be incorporated at about 1-30%, preferably at about 5-25%.

Dispersant

Pigments may be stabilized by dispersants, such as polymeric dispersants or surfactants, to produce a stable dispersion of the pigment when the pigments and resin are subjected to a gelling agent.

Pigments that are stabilized by added dispersing agents may be prepared by methods known in the art. It is generally desirable to make the stabilized pigment in a concentrated form. The stabilized pigment may be first prepared by premixing the selected pigment(s) and polymeric dispersant(s) in a carrier medium, and then dispersing or deflocculating the pigment. The dispersing step may be accomplished, for example, in a 3-roll mill, media mill, a horizontal mini mill, a ball mill, an attritor, or by passing the mixture through a plurality of nozzles within a liquid jet interaction chamber at a liquid pressure of at least 5,000 psi to produce a uniform dispersion of the pigment particles in the carrier medium (microfluidizer). Alternatively, the concentrates may be prepared by dry milling the polymeric dispersant and the pigment under pressure. After the milling process is complete the pigment concentrate may be "let down" into a solvent system. "Let down" refers to the dilution of the concentrate with mixing or dispersing, the intensity of the mixing/dispersing normally being determined by trial and error using routine methodology, and often being dependent on the combination of the polymeric dispersant, solvent and pigment. As an example, the stabilized pigment can be prepared with a dispersant using a traditional high speed Cowles mixer/dissolver.

The dispersant used to stabilize the pigment is preferably a polymeric dispersant similar to that used in the coatings field. Some examples are polyacrylate, polyurethane and polyurethane acrylate. The following commercial products may be used: EFKA™ 4008 (modified polyurethane), EFKA™ 4009 (modified polyurethane) or EFKA™ 4300 (acrylic block copolymer) from BASF.

A wide variety of polymeric dispersants is suitable for use in the present invention. These polymeric dispersant generally may comprise both hydrophobic and hydrophilic monomers. Some examples of hydrophobic monomers used in polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl(meth)acrylate may be employed.

The dispersant may be present in about 0.5-10%, preferably about 2-8%.

Gelling Agent

The liquid dispersion containing the resin and pigment needs to be gelled in order to be useful for marking functions. Furthermore, the key to the optimal performance properties is a final material that does not have a sharp melting point, but rather a melting range higher than the ambient use temperature. For example, the melting point of the composition spans a broad range (for example, about 50-75° C.), not a specific single point. This is important because a sharp melting point near the usage temperature could render the marking device liquid and inoperable.

The objective above can be met by several methods. One of the methods is blending at least two dissimilar (with respect to chemical composition or melting point) waxes together. Another exemplary method is blending a wax and a softening wax, or wax modifier. For example, a Montan wax, synthetic Montan wax, Prisorine 3800 (currently known as Syncrowax™ ORM, a sorbitol/sebacic acid copolymer behenate), or Synchrowax™ ERLC (a synthetic wax composed of a C18-C36 acid glycol ester). Waxes can be present in about 10-35%, and preferably in about 20-30% of the total weight of the composition.

A wax modifier can be used to further harden the gel, hence improve the writing properties of the stick comprising a solid marking composition. A wax modifier can be used in about 1-16%, and preferably in about 10-16%. Generally, amounts above about 16% may degrade the writing properties.

Waxes can be mixed with other materials to lower or raise the melting point and the flow point when the mixture is subjected to shear. The wax modifier can be a higher melting point steramide, for example INCROMIDE™ SMEA-PW-(AP). Another example is solvents that are miscible with the wax such as isoparaffinic solvents. The proper selection of the solvent flashpoint is an important consideration for plant safety, the length of time the solvent remains in the original mark made with the mixture, and the effect on the ability of the mixture to make an effective mark. Solvents that are non-volatile can act as permanent plasticizers for the film imparting long term flexibility. Other permanent solvents that act as plasticizers include methyl esters of soybean oil, high molecular weight ester compounds, and oxygenated solvents such as high molecular weight glycol ethers similar to dipropylene glycol methyl ether. Low molecular weight alcohols, esters, and ethers can also modify waxes when blended together. The low molecular weight alcohols, such as isopropanol, low molecular weight esters, such as ethyl lactate, and low molecular weight ethers, such as tetrahydrofuran can depress the melting point of blends with waxes. This will make the wax mixture softer and easier to mark with. The low molecular weight alcohols, ethers, and esters will soon evaporate from wax films and leave the waxes unchanged in the dry film.

Furthermore, a gel network can be established in the writing composition to improve glide and rigidity. This may be done with plant oils that include linoleic acid, stearic acid and oleic acid. Synthetic saturated linear carboxylic acid prepared from ethylene can also be used, for example Performacid 350 (New Phase Technologies). These plant or synthetic acids can be hardened with aluminum stearate to form gels. The acid or salt is present in about 5-25%, and preferably about 10-20%, in the writing matrix to form rigid gels.

Other Additives

In order to provide rigidity to the writing composition, a small amount of low melting point polyethylene (melting point less than about 120° C.) such as Marcus 200 Polyethylene may be used at a concentration of about 0.5-10%, and preferably about 1-5%.

Other additives may include pigment wetting agent, filler agent, leveling agent, viscosity modifier, drying agent, etc. in suitable amounts. When natural plant oils such as linseed oil, safflower oil and castor oil are used, it is necessary to thoroughly dry them and the use of metal organic acid compounds such as Troymax 12%, Troymax Zirconium 12% from Troy Chemical or WD Cobalt 12%, WD Zirconium 12% from Westdry Industries may be added to the formulation to ensure surface and through drying. These materials increase the oxidation and cross linking rate of the organic acid components of the oils. Additionally oxidation may be facilitated by the addition of an organic catalyst such as Opti-dry, a 2,2-bipyridyl solution from Westdry Industries. In this case a cobalt drier is a fast surface drier and zirconium and manganese driers are through film driers. Some commercial examples of the additives are Zeeospheres™ W610, Troymax™ Cobalt 12%, Troymax™ Zirconium 12%, and Opti-dry™.

EXAMPLES

The following examples are intended to illustrate the solid composition of the invention. The invention is not limited to the examples described below.

Example 1

The table below is an example of using SYNCROWAX™ ERLC (a C18-C36 acid glycol ester) as the gelling agent. Although the melting point is relatively sharp, this composition provides adequate writing abilities.

TABLE 1

| Material | Range (%) |
|---|---|
| IPAR 100 from Chemista Specialty Chemicals | 5-20 |
| Soyclear ™ 1500 | 1-20 |
| Resinall ® 807 A | 3-15 |
| EFKA ™ 4008 | 0.5-10 |
| Huntsman Tioxide ® TR-93 | 1-30 |
| Nyad ® 400 | 2-15 |
| Syncrowax ™ ERLC | 2-20 |

The marking composition in Table 1 is prepared according to the method below:
1) Charge to a sealable container:
   a. Ipar 100
   b. Soyclear 1500
   c. Efka 4008
2) Mix for 30 seconds then add:
   a. Resinall 807A
3) After the Resinall is added seal the container to prevent evaporation of the Ipar 100 and to prevent flashfires.
4) Start agitation in the container. Heat to 45-60 C and continue heating and agitation until the Resinall is dissolved. It will form a clear amber solution.
5) Once dissolved relieve the pressure and then add the Tioxide and Nyad powder to the container. Seal the container and increase agitator speed to dispersion speed.
6) Disperse for 15-20 minutes or until the ground particle size is less than 10 microns.
7) Increase the temperature to 80 C in the container. Once the temperature is reached depressurize the container and add SYNCROWAX® ERLC
8) Continue heating and agitation until the SYNCROWAX® ERLC wax is melted.
9) Once the SYNCROWAX® ERLC is melted continue mixing for 10 minutes then cast into a suitable mold.

Example 2

Table 2 details a formulation that provides adequate marking and adhesive properties.

TABLE 2

| Material | Range (%) |
|---|---|
| IPAR 100 from Chemista Specialty Chemicals | 5-20 |
| Soyclear ™ 1500 | 1-20 |
| Resinall ® 807A | 3-15 |
| EFKA ™ 4009 | 0.5-10 |
| Huntsman Tioxide ® TR-93 | 1-30 |
| Nyad ® 400 | 2-15 |
| Montan Wax (Syncowax ERL-C from Croda,) Synthetic Montan Wax (V WAX OP powder from Struktol Industries) or SYNCROWAX ™ ORM | 10-30 |
| INCROMIDE ™ SMEA-PW-(AP) | 1-20 |

The marking composition in Table 2 is prepared according to the method below:
1) Charge to a sealable container:
   a. Ipar 100
   b. Soyclear 1500
   c. Efka 4009
2) Mix for 30 seconds then add:
   a. Resinall 807A
3) After the Resinall is added seal the container to prevent evaporation of the Ipar 100 and to prevent flashfires.
4) Start agitation in the container. Heat to 60° C. and continue heating and agitation until the Resinall is dissolved. It will form a clear amber solution.
5) Once dissolved relieve the pressure and then add the Tioxide and Nyad powder to the container. Seal the container and increase agitator speed to dispersion speed.
6) Disperse for 15-20 minutes or until the ground particle size is less than 10 microns.
7) Increase the temperature to 80-85° C. in the container. Once the temperature is reached depressurize the container and add the:
   a. V wax OP
   b. INCROMIDE® SMEA
8) Continue heating and agitation until the V Wax OP and INCROMIDE® SMEA waxes are melted.
9) Once the V Wax OP and INCROMIDE® SMEA waxes are melted continue mixing for 10 minutes then cast into a suitable mold.

Alternative Method for Processing

If additional volume is needed due to the geometry of the mixing container some of the V Wax OP and or INCROMIDE® SMEA can be melted and moved into the first step.

Example 3

Table 3 is an example of how rigid gels may be formed in the marking composition to provide structure and glide when writing. The aluminum stearate when heated with the linseed oil forms a gel that is a soap. Additionally the Performacid 350 crosslinks with the aluminum stearate to form a rigid but smooth gliding gel.

TABLE 3

| Material | Range (%) |
|---|---|
| Alkali-refined Linseed Oil | 1-20 |
| EFKA ™ 4009 | 0.1-30 |
| White Microcrystalline wax 1329/1 (melting point 160-170C, Frank B. Ross Waxes) | 0.05-5 |
| Ozokerite 863 (Frank B. Ross Company) or Ozokerite 1090 (Koster Keunen LLC) | 5-20 |
| Performacid ® 350 (a fully saturated linear carboxylic acid synthesized from ethylene by a unique polymerization process. From New Phase Technologies) | 5-20 |
| Troymax ™ Cobalt 12% | 5-20 |
| Troymax ™ Zirconium 12% | 0.05-5 |
| Opti-dry ™ | 0.05-5 |
| Aluminum Stearate | 1-10 |
| Zeeospheres ™ W610 | 5-20 |
| Titanium dioxide, and/or Tioxide TR-93 | 5-20 |
| Nytal ® 400 (Wollastonite pigment) | 1-10 |
| Marcus ™ Polyethylene Wax | 2-10 |

The marking composition in Table 3 is prepared according to the method below:
1) Charge a mixing vessel with:
   a. Alkali refined Linseed oil
   sb. EFKA 4009
2) Heat to 100 C and add:
   a. White Microcrystalline wax 1329/1, MP
   b. Ozokerite, 863
   c. Performacid® 350 Acid
3) Mix until all of the powders are melted and then add under agitation:
   a. Aluminum Stearate
4) Heat to 135° C. and agitate until the white Aluminum stearate is dissolved. Once it dissolves it will be a clear amber colored mixture.

5) Add the following materials to the mixture under agitation:
   a. Zeeospheres W610
   b. Titanium dioxide (Tioxide TR-93)
   c. Nyad 400
6) Increase the speed to dispersion speed. Disperse for 15 minutes or until the particle size is less than 20 microns.
7) Lower the temperature to 120° C.
8) Then add the following materials under agitation:
   a. Troymax Cobalt 12%
   b. Troymax Zirconium 12%
   c. Opti-Dry
9) Continue mixing for 10 minutes and then cast into a suitable mold.

What is claimed is:

1. A solid marking composition comprising at least one resin, at least one pigment, at least one dispersant, at least one solvent, and a gelling agent, wherein the resin is selected from the group consisting of polyimide, rosin ester and combinations thereof, the gelling agent comprises at least one wax and at least one wax modifier, wherein the at least one wax is selected from the group consisting of a Montan wax, a synthetic Montan wax, a sorbitol/sebacic acid copolymer behenate, a synthetic wax comprising a $C_{18}$-$C_{36}$ acid glycol ester, linoleic acid, stearic acid, oleic acid, and combinations thereof, and further wherein the at least one wax modifier comprises a stearate salt, and further wherein the waxes are about 10-15% by weight of the composition.

2. The solid marking composition of claim 1 wherein the composition provides waterproof and weather resistant marks.

3. The solid marking composition of claim 1 wherein the solid marking composition melts at about 50-75° C.

4. The solid marking composition of claim 1 wherein the resin is about 3-15% by weight.

5. The solid marking composition of claim 1 wherein the wax modifier is about 1-16% by weight.

6. The solid marking composition of claim 1 wherein the at least one solvent is selected from the group consisting of isopropyl alcohol, denatured alcohol, an ester, and combinations thereof.

7. The solid marking composition of claim 6 wherein the at least one solvent is about 5-40% by weight.

8. The solid marking composition of claim 7 wherein the solid marking composition comprises at least two solvents.

9. The solid marking composition of claim 1 wherein the dispersant is a polymer.

10. The solid marking composition of claim 9 wherein the dispersant is about 0.5-10% in weight.

11. A method of making the solid marking composition of claim 1 comprising at least one resin, at least one pigment, at least one dispersant, at least one solvent, and a gelling agent, wherein the gelling agent comprises at least one wax and at least one wax modifier, comprising the following steps:
   a. add the at least one resin to the at least one solvent, and dissolve by stifling with heat;
   b. add the at least one pigment and the at least one dispersant;
   c. optionally increase the heat;
   d. add the at least one gelling agent and the at least one wax modifier;
   e. cast into a mold.

* * * * *